April 18, 1961  P. H. BOOTH  2,979,808
METHOD AND APPARATUS FOR SECURING SKIN TO A CORE
Filed Jan. 31, 1957  2 Sheets-Sheet 1
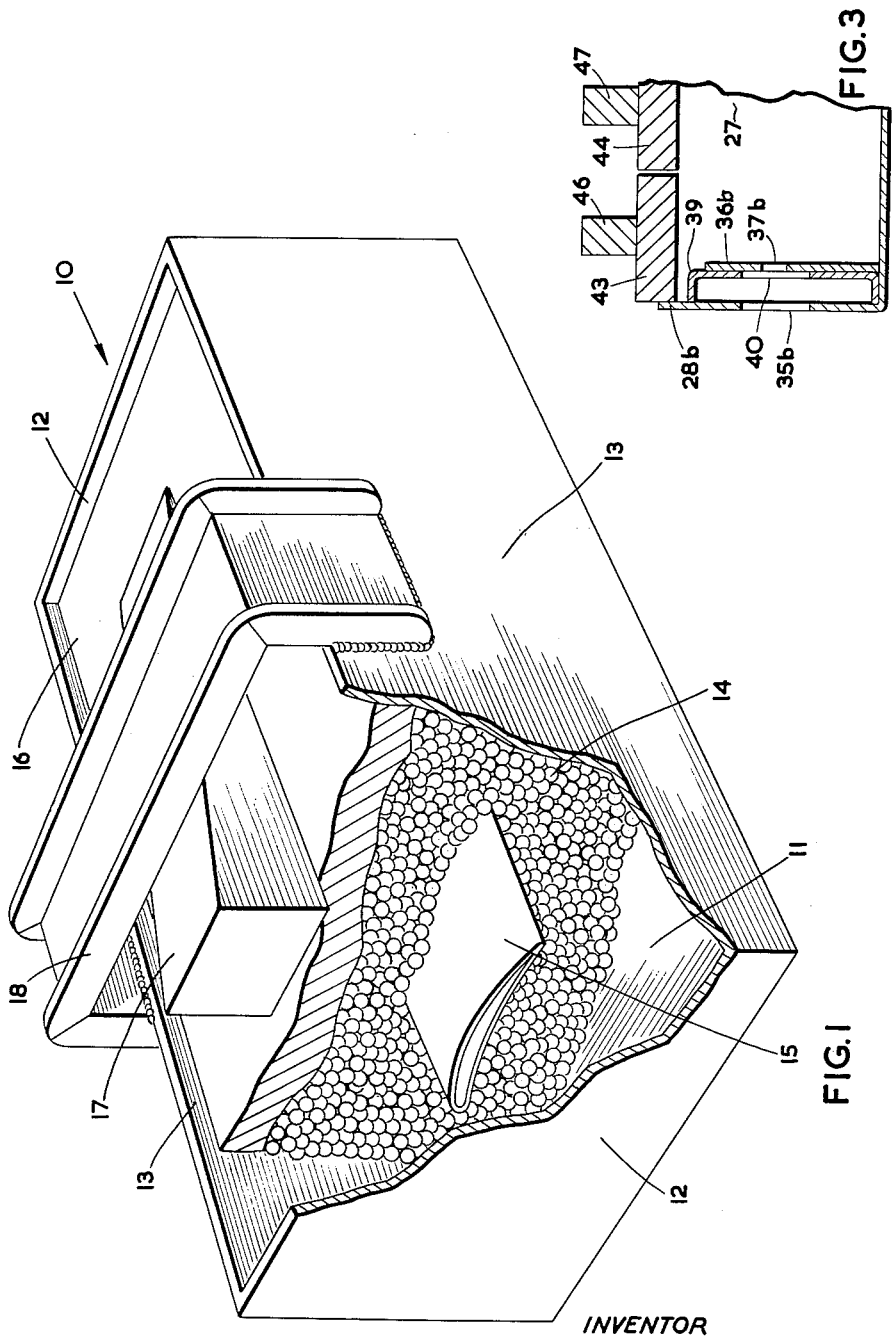
INVENTOR
P.H. BOOTH
BY: Maybee & Legris
ATTORNEYS

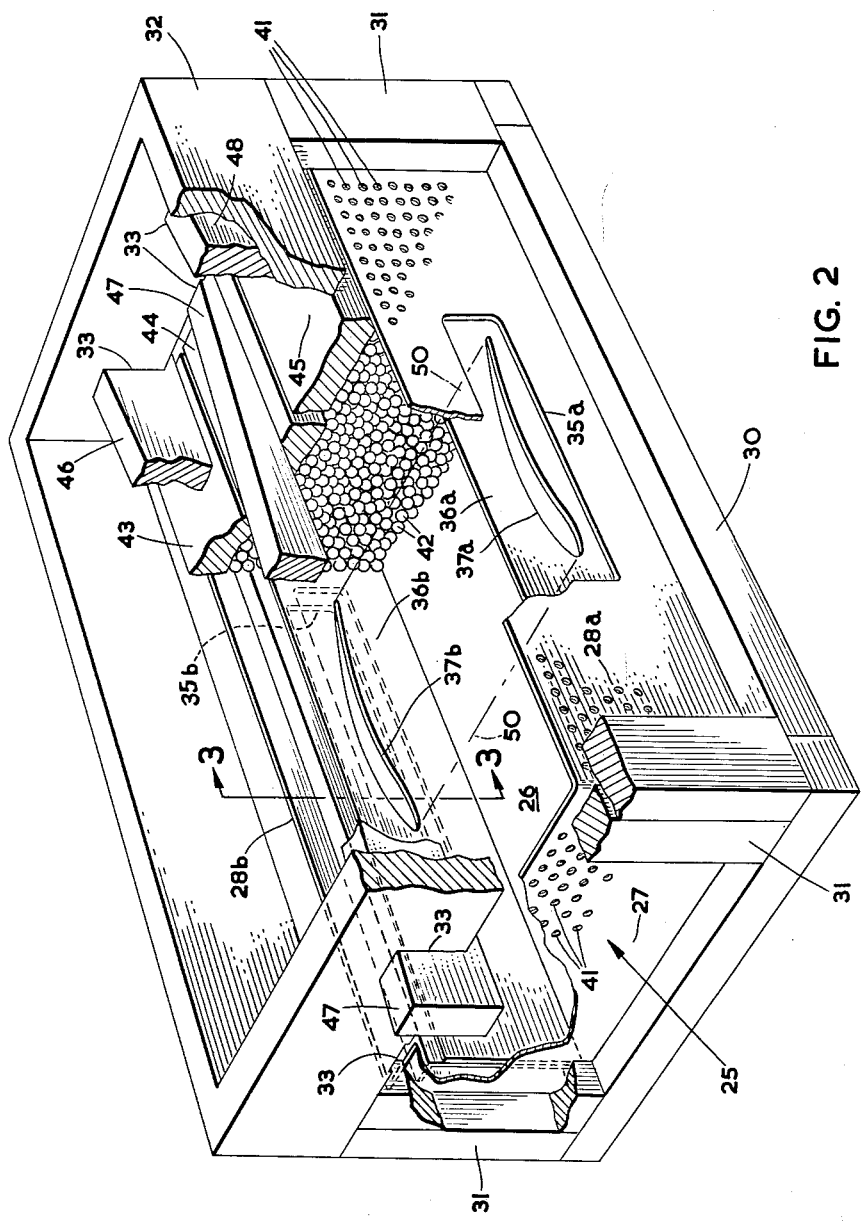

United States Patent Office 2,979,808
Patented Apr. 18, 1961

2,979,808
METHOD AND APPARATUS FOR SECURING SKIN TO A CORE

Peter H. Booth, Toronto, Ontario, Canada, assignor to Orenda Engines Limited, Malton, Peel County, Ontario, Canada, a corporation Filed Jan. 31, 1957, Ser. No. 637,547

6 Claims. (Cl. 29—156.8)

This invention relates to apparatus for use when securing a skin of sheet material to a core, and has particular application when securing a skin to a core having a complexly curved surface.

The invention relates specifically to an apparatus for use when brazing a sheet metal skin to an aerofoil-section core of a blade of the type employed in a gas-turbine engine, and has particular application where the core is grooved or fluted to provide, in conjunction with the skin, a plurality of passages for cooling air.

When brazing such a skin to an aerofoil-section core, great difficulty has been experienced in maintaining those surfaces of the skin and core which are to be mutually secured in intimate engagement during the brazing operation, and heretofore it has been required that the skin be accurately preformed to closely embrace the core. Further problems arise due to the fact that the skin may distort during the heating and cooling consequent on the brazing operation, with the result that the thickness of the layer of brazing material between the mutually secured surfaces may vary, and, consequently, inaccuracies in the cross-section of the cooling passages and of the profile of the assembled blade are encountered. In extreme cases the spacing between the mutual presented surfaces of the skin and core may, in certain areas, be so great that the surface tension of the molten brazing metal will be insufficient to maintain the brazing metal bridging the space, thus causing a "dry joint" and modifying the mechanical characteristics of the finished blade.

The object of this invention is to provide apparatus whereby a surface of a skin of sheet material may be maintained in intimate contact with a mutually presented surface of a core while the skin and core are being mutually secured.

A further object of the invention is to provide an improved method of securing mutually presented surfaces of a skin of sheet material and a core.

Throughout the following description and the subjoined claims, the term "mass of substantially spherical bodies" is used to mean a mass of discrete material which has a low critical angle of repose and low surface friction, the material being refractory or inert to solvents or cements used in securing the skin to the core. Examples of such material are a mass of small steel balls, or a mass of small glass, ceramic or silica beads, although it will be obvious that certain other materials will be found eminently suitable for the purposes of the invention.

Such a mass of substantially spherical bodies, while it exhibits the characteristics of a fluid when its movement is unconstrained, exhibits the characteristics of a solid when it is confined and it is subjected to pressure. The reason for this "freezing" of the mass is that the substantially spherical bodies, after moving within the mass for the mass to occupy a minimal volume, act to transmit the said pressure to the adjacent bodies and to jam or wedge against each other in a manner prohibiting further movement.

According to the invention, the apparatus includes a container within which is a mass of small, substantially spherical bodies, the assembled skin and core being submerged in the mass of substantially spherical bodies prior to the securing operation, there being means provided for applying pressure to the mass of substantially spherical bodies to cause it to force the skin, and thus the mutually presented surfaces of the skin and the core into intimate contact, the pressure being maintained during the operation of securing.

According to a further feature of the invention, the method of securing a sheet of material to a core includes the steps of applying a cementitious material to at least one of the surfaces of the sheet material and core which are to be mutually presented, assembling the sheet material and core with their mutually presented surfaces in proximity to each other, surrounding the assembled sheet material and core with a mass of small, substantially spherical bodies which are inert to the cementitious material and stable under a process to be carried out on the cementitious material, applying pressure to the mass of substantially spherical bodies to force the mutually presented surfaces of the sheet material and core into intimate contact, and maintaining the pressure on the mass whilst the processing of the cementitious material is carried out.

The foregoing and further objects and advantages of the invention will become apparent from a study of the following description when taken in conjunction with the accompanying drawings in which:

Fig. 1 is a fragmentary perspective view of a simple form of the assembled apparatus according to the invention, and shows a sheet metal skin assembled on a core of an aerofoil-section blade in the position they would occupy during a securing operation;

Fig. 2 is a fragmentary perspective view of the preferred form of apparatus according to the invention; and Fig. 3 is a section of the line 3—3 of Fig. 2.

Referring to Figure 1, the apparatus includes a metal box 10 having a bottom wall 11, vertical end walls 12, and vertical side walls 13.

Within the box 10 is a mass 14 of small substantially spherical bodies provided for example, by a plurality of 3/16" diameter steel balls, the mass surrounding the assembled skin and core, which is indicated at 15.

Lying on top of the mass 14 is a plate 16 which confines the mass with the box, and which can be forced inwardly of the box by means of a wedge 17 acting between the plate and a bridge member 18 fast with the side walls 13.

The member 16 is placed in position, and the wedge 17 is driven under the bridge 18 to apply pressure to the mass 14, the pressure being applied through the mass to force the mutually presented surfaces of the skin and core into intimate contact. Before assembling the skin and core, at least one of each of the surfaces to be secured is coated with brazing metal and flux, the assembled skin and core then being submerged in the mass 14.

The complete apparatus is then heated, for example it is placed in an oven, and the temperature of the complete assembly is brought up to that required for effecting the brazing operation, after which the apparatus is removed from the oven and allowed to cool. If desired, the pressure on the skin may be further increased on removal of the apparatus from the oven by driving the wedge further under the bridge.

When the apparatus has cooled down to a temperature at which it can be handled, the wedge 17 is removed, as is the member 16, and the blade is removed from the mass 14 for final finishing.

Referring now to Figures 2 and 3 which show a preferred construction of the apparatus according to the invention, the apparatus includes a metal box 25 provided by a bottom wall 26, opposed vertical end walls 27 and opposed vertical side walls 28a, 28b. The bottom wall 26 is supported on a rigid rectangular frame 30, the corners of the box being supported by posts 31, fast at their lower ends with the frame 30. Secured to the upper ends of the posts 31 is a further rigid rectangular frame 32 which is slotted at 33 for a purpose hereinafter described.

The opposed vertical side walls 28a, 28b of the box are respectively provided with an aperture 35a, 35b, which as shown, is of rectangular outline, and positioned within the box and parallel to the side walls are plates 36a, 36b. having aligned apertures 37a, 37b, respectively, the apertures being of complementary outline to the cross section of the assembled skin and core to be brazed. The plates 36a, 36b are not secured to the side walls, and therefore, corresponding plates having apertures of a profile complementary to the cross-section of an assembled skin and core having a different profile or twist may be substituted. The plate 36a directly abuts the side wall 28a, whereas the plate 36b abuts a channel section member 39 having an aperture 40 aligned with and complementary to the aperture 35b. The channel member 39 is removably mounted in the box and may be replaced by a similar member having a different depth of channel for the apparatus to accommodate an assembled skin and core of different axial length.

Preferably the walls of the box are perforated with, for example, 1/8" diameter holes as is indicated at 41, to reduce the time required for heating or cooling the apparatus.

Within the box is a mass 42 of substantially spherical bodies, preferably provided by, for example, a plurality of steel balls of about 3/16 inch diameter, on which mass is placed rigid bars 43, 44, 45, the bars being positioned for a portion of their thickness to be within the confines of the side and end walls and being surmounted by wedges 46, 47, 48. The wedges are located in the slots 33 of the frame 32, and it will be observed that the slots 33 are of different depths and so arranged that the wedge 47 extends in an opposite direction to the wedges 46 and 48. In this way the pressure exerted on the mass 42 can be more uniformly distributed.

In use, the skin assembled on the core is passed through the apertures 37a, 37b, as is indicated by the chain lines 50, and is surrounded by the mass 42. The bars 43 to 45 are then placed in position, and the respective wedges are driven into the slots 33 to apply pressure to the mass 42, and thus in turn to the skin, to force the mutually presented surfaces of the skin and core into intimate contact.

The operation of brazing is then carried out as previously described.

Whereas the apparatus above described is particularly adapted to the brazing of a sheet metal skin to the core of an aerofoil-section blade, it will be appreciated that the apparatus has equal application in securing a skin to a core other than of aerofoil section, and also, that although the operation specifically referred to is that of brazing, the apparatus is of equal application when cementing a skin to a core, for example, when cementing a sheet of plastics or fibrous material to a core of another substance. In this event, it is necessary for the substantially spherical bodies to be inert to the cement used and stable under the process required for effecting the cementing, i.e., the rollable bodies forming the mass must not soften under heat or in the presence of solvents in the cement, which conditions are fulfilled by the steel balls previously referred to.

The apparatus above described is preferably formed of metal, although it will be obvious that in some applications other materials may be used, and as the apparatus is to be used at a temperature at which brazing can be effected, it will be obvious that the metal selected must be capable of withstanding the brazing temperature.

What I claim as my invention is:

1. A method of securing a skin member of sheet metal to the entire peripheral surface of a core member, comprising the steps of; applying a layer of heat-fusible bonding material to a surface of at least one of said members, wrapping said skin member about the peripheral surface of said core member with said bonding material therebetween to form an assembly, submerging said assembly in a mass of small substantially spherical metal bodies so that a multiplicity of said bodies bear against the outer surface of said skin member over substantially the entire area of said peripheral surface, confining said bodies to a predetermined space, applying pressure to said mass of bodies whereby to transmit substantially uniform radial pressure to said skin throughout the entire area of said peripheral surface, and maintaining said pressure on said bodies and heating said bodies and assembly to fuse said bonding material.

2. Apparatus for use when securing a skin of sheet material to a core of an aerofoil-section blade, including a box having a horizontal bottom wall, opposed vertical side walls and opposed vertical end walls, the opposed side walls having aligned apertures through which the sheet material assembled on the core of the blade can be passed for the skin and core to extend transversely of the interior of the box, a normally fluid mass of small substantially spherical bodies within the box and for enveloping that portion of the assembled skin and core extending between the opposed side walls, and means for applying and maintaining pressure on the mass of bodies to cause said mass to force the mutually presented surfaces of the skin and blade into intimate contact and thereafter to cause said mass to exhibit the characteristics of a solid to maintain said surfaces in intimate contact.

3. Apparatus according to claim 2, in which the spherical bodies are metal balls.

4. Apparatus for use when brazing a sheet metal skin to a core of an aerofoil-section blade, including a box having a horizontal bottom wall, opposed vertical side walls and opposed vertical end walls, removable plates within the box and extending parallel to the opposed side walls, the opposed side walls and the plates having aligned apertures through which the sheet metal skin assembled on the core of the blade can be passed for the skin and core to extend transversely of the interior of the box, the apertures in the plates being substantially co-extensive with the transverse periphery of the skin when assembled on the core, a normally fluid mass of small substantially spherical bodies within the box and for enveloping the assembled skin and core, and means for applying and maintaining pressure on the mass of bodies to cause said mass to force the mutually presented surfaces of the skin and core into intimate contact, and thereafter to cause said mass to exhibit the characteristics of a solid to maintain said surfaces in intimate contact.

5. Apparatus for use when brazing a sheet metal skin to a core of an aerofoil-section blade, including a box having a horizontal bottom wall, opposed vertical side walls and opposed vertical end walls, the opposed side walls having aligned apertures through which the sheet metal skin assembled on the core of the blade can be passed for the skin and core to extend transversely of the interior of the box, a normally fluid mass of small substantially spherical bodies within the box and for enveloping the assembled skin and core, a substantially rigid member confining the bodies within the box, the member lying substantially parallel to the bottom wall and being positioned within the confines of the side and end walls and at least one wedge engaging said member and box for forcing the member inwardly of the box to apply and maintain pressure on the mass of bodies and thus to the skin to force the mutually presented surfaces of the skin and core into intimate contact, and thereafter to cause said mass to exhibit the characteristics of a solid to maintain said surfaces in intimate contact.

6. Apparatus for use when brazing a sheet metal skin to the core of an aerofoil-section blade, including a box having a horizontal bottom wall, opposed vertical side walls and opposed vertical end walls, a rigid rectangular frame on which the box is mounted and which supports at least the bottom edges of the box, posts extending from the corners of the frame to above the top edge of the box, the posts supporting the vertical edges of the box, a second rigid rectangular frame mounted on the posts and lying above the top edge of the box, plates within the box and extending parallel to the opposed side walls, the opposed side walls and the plates having aligned apertures through which the sheet metal skin assembled on the core of the blade can be passed for the skin and core to extend transversely of the interior of the box, the apertures in the plates being substantially co-extensive with the transverse periphery of the skin when assembled on the core, a normally fluid mass small substantially spherical bodies within the box and for eneveloping the assembled skin and core, a substantially rigid member confining the spherical bodies within the box, the member lying substantially parallel to the bottom wall and being positioned within the confines of the side and end walls, and at least one wedge interposed between the second frame and the member for forcing and holding the member inwardly of the box to apply pressure to the mass of bodies and thus to the skin to force the mutually presented surfaces of the skin and core into intimate contact, and thereafter to cause said mass to exhibit the characteristics of a solid to maintain said surfaces in intimate contact.

References Cited in the file of this patent

UNITED STATES PATENTS

| | | |
|---|---|---|
| 1,050,534 | Hart et al. | Jan. 14, 1913 |
| 1,548,730 | Mirfield | Aug. 4, 1925 |
| 1,715,659 | Jokach | June 4, 1929 |
| 2,138,974 | MacDonald | Dec. 6, 1938 |
| 2,326,430 | Blanchard | Aug. 10, 1943 |
| 2,366,164 | Weick et al. | Jan. 2, 1945 |
| 2,464,574 | Hengstler | Mar. 15, 1949 |
| 2,658,415 | Barowsky | Nov. 10, 1953 |
| 2,825,794 | Stalker | Mar. 4, 1958 |

FOREIGN PATENTS

| | | |
|---|---|---|
| 76,279 | Austria | Apr. 25, 1919 |